(12) United States Patent
Wlodarczyk et al.

(10) Patent No.: US 9,719,864 B2
(45) Date of Patent: Aug. 1, 2017

(54) METHOD AND SYSTEM FOR DETERMINING AMBIENT TEMPERATURE OF AN ELECTRONIC DEVICE

(71) Applicant: Advanced Digital Broadcast S.A., Chambesy (CH)

(72) Inventors: Miroslaw Wlodarczyk, Zielona Gora (PL); Piotr Paszkudzki, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 456 days.

(21) Appl. No.: 14/312,730

(22) Filed: Jun. 24, 2014

(65) Prior Publication Data

US 2014/0379290 A1    Dec. 25, 2014

(30) Foreign Application Priority Data

Jun. 24, 2013   (EP) .................................... 13173355

(51) Int. Cl.
*G01K 7/42*     (2006.01)
*G06F 1/20*     (2006.01)

(52) U.S. Cl.
CPC .............. *G01K 7/42* (2013.01); *G01K 7/427* (2013.01); *G06F 1/206* (2013.01)

(58) Field of Classification Search
CPC ....................................................... G01K 7/427
(Continued)

(56) References Cited

U.S. PATENT DOCUMENTS 3,358,152 A * 12/1967 Alexakis ................. H01L 23/34
                                                        219/499
6,754,607 B2   6/2004 Tanabe
(Continued)

*Primary Examiner* — Bryan Bui
(74) *Attorney, Agent, or Firm* — Mark M. Friedman

(57) ABSTRACT

A method for determining the ambient temperature of an electronic device, the device comprising heat-generating components (102) and a temperature sensor (105) positioned within a common casing (101), the method comprising the steps of: in an environment with a controlled ambient temperature: determining (307) a device-specific coefficient of power dissipation change (a) between a first ($E_{min}$) and second ($E_{max}$) power modes, wherein in the second power mode ($E_{max}$) the device dissipates more power than in the first power mode ($E_{min}$); and in an environment for which the ambient temperature is to be determined: measuring (203-205) temperatures ($T_{min}$, $T_{max}$) by the temperature sensor (105) for the first power mode ($E_{min}$) and the second power mode ($E_{max}$), calculating (206) ambient temperature ($T_{amb}$) as a function of the measured temperatures ($T_{min}$, $T_{max}$) and the device-specific coefficient of power dissipation change (a).

18 Claims, 3 Drawing Sheets

(58) Field of Classification Search
USPC .......................................................... 702/130
See application file for complete search history.

(56) References Cited

U.S. PATENT DOCUMENTS

| | | |
|---|---|---|
| 8,374,730 B2 | 2/2013 | Conroy et al. |
| 2011/0205071 A1 | 8/2011 | Nakmekawa |
| 2013/0002173 A1* | 1/2013 | Baglino .............. B60L 11/1872 318/139 |

* cited by examiner

METHOD AND SYSTEM FOR DETERMINING AMBIENT TEMPERATURE OF AN ELECTRONIC DEVICE

FIELD OF THE INVENTION

The present invention relates to determining ambient temperature of an electronic device.

BACKGROUND OF THE INVENTION

Electronic devices are typically designed to operate in specific ambient conditions, defined typically by allowable humidity and temperature ranges, which are typically normal for a given geographical area in which the device is supposed to operate. For example, a device may be supposed to operate in a range of temperatures from +5 to +35 degrees C. This range is typically normal for interior of households.

However, at end-user premises, a device may be, usually unintentionally, is placed in an environment where the conditions exceed the allowed temperature range. For example, a DVD player or a set-top box may be placed in a closed cabinet which is subject to sunshine. In those conditions, taking into account the heat generated by the device itself and the heat of the sunshine, the ambient atmosphere of the device will likely exceed the allowed temperature. This may lead to failure of the device due to overheating. Moreover, the device may overheat even if the ambient temperature is within allowed limits, but the device is installed improperly, e.g. when the ventilation openings at the device casing are covered, causing increase of thermal resistance of the device, e.g. by laying a newspaper on top of the device.

It is, therefore desirable to monitor the ambient temperature for the electronic device in order e.g, to cause its automatic power-down or to store data for servicing purposes, when the temperature exceeds allowed range. It is further desirable to monitor the change of thermal resistance of the electronic device.

For example, U.S. Pat. No. 8,374,730 presents methods and apparatuses for dynamically budgeting power usage to control temperatures in a data processing system. The system includes a first sensor to determine an ambient temperature of an environment in which the data processing system is; a controller coupled to the sensor to control operations of the data processing system according to the ambient temperature; and a second sensor to determine an actual temperature of a component of the data processing system.

Similarly, U.S. Pat. No. 6,754,607 presents a failure diagnosis method for control apparatus, the apparatus comprising a first sensor for detecting the internal temperature of the control apparatus, a second sensor for detecting the external temperature of the control apparatus, and internal memory media for storing information that has been created inside the control apparatus.

Such dedicated ambient temperature sensors add to the cost and is complexity of the device.

SUMMARY

The object of the invention is a method for determining the ambient temperature of an electronic device, the device comprising heat-generating components and a temperature sensor positioned within a common casing, the method comprising the steps of: in an environment with a controlled ambient temperature: determining a device-specific coefficient of power dissipation change (a) between a first ($E_{min}$) and second ($E_{max}$) power modes, wherein in the second power mode ($E_{max}$) the device dissipates more power than in the first power mode ($E_{min}$); and in an environment for which the ambient temperature is to be determined: measuring temperatures ($T_{min}$, $T_{max}$) by the temperature sensor for the first power mode ($E_{min}$) and the second power mode ($E_{max}$), calculating ambient temperature ($T_{amb}$) as a function of the measured temperatures ($T_{min}$, $T_{max}$) and the device-specific coefficient of power dissipation change (a).

Preferably, the method further comprises the step of comparing the determined ambient temperature ($T_{amb}$) with a maximum allowed ambient temperature ($T_{ambmax}$) and invoking an alarm in case the determined ambient temperature ($T_{amb}$) is higher than the maximum allowed ambient temperature ($T_{ambmax}$).

Preferably, the method further comprises the steps of: in the environment with the controlled ambient temperature: determining device-specific product ($R*P_{min}$) of thermal resistance (R) between the device and device's ambient and power dissipation ($P_{min}$) in the first power mode ($E_{min}$); and—in the environment for which the ambient temperature is to be determined: determining a coefficient of thermal resistance device-device's ambient change (b) as a function of the measured temperatures ($T_{min}$, $T_{max}$) and device-specific product ($R*P_{min}$).

Preferably, the method further comprises the step of, in case the calculated coefficient of thermal resistance (b) exceeds the value of 1, invoking an alarm.

Another object of the invention is a computer program comprising program code means for performing all the steps of the method according to the is invention when said program is run on a computer, as well as a computer readable medium storing computer-executable instructions performing all the steps of the method according to the invention when executed on a computer.

The object of the invention is also an electronic device comprising heat-generating components and a temperature sensor positioned within a common casing, the device further comprising: a non-volatile memory configured to store a device-specific coefficient of power dissipation change (a) between a first ($E_{min}$) and second ($E_{max}$) power modes, wherein in the second power mode ($E_{max}$) the device dissipates more power than in the first power mode ($E_{min}$); and a controller configured to determine the ambient temperature by: measuring temperatures ($T_{min}$, $T_{max}$) by the temperature sensor for the first power mode ($E_{min}$) and the second power mode ($E_{max}$), calculating the ambient temperature ($T_{amb}$) as a function of the measured temperatures ($T_{min}$, $T_{max}$) and the device-specific coefficient of power dissipation change (a) read from the non-volatile memory.

Preferably, the controller is further configured to compare the determined ambient temperature ($T_{amb}$) with a maximum allowed ambient temperature ($T_{ambmax}$) and to invoke an alarm in case the determined ambient temperature ($T_{amb}$) is higher than the maximum allowed ambient temperature ($T_{ambmax}$).

Preferably, the non-volatile memory is further configured to store device-specific product ($R*P_{min}$) of thermal resistance (R) between the device and device's ambient and power dissipation ($P_{min}$) in the first power mode ($E_{min}$); and the controller is further configured to detect a coefficient of thermal resistance device—device's ambient change by determining a coefficient of thermal resistance device-device's ambient change (b) as a function of the measured temperatures ($T_{min}$, $T_{max}$) and device-specific product ($R*P_{min}$).

Preferably, the controlled is further configured to, in case the calculated coefficient of thermal resistance (b) exceeds the value of 1, invoke an alarm.

The present invention utilizes a single sensor inside the casing of the device to determine the ambient temperature and thermal resistance changes. This simplifies the design of the electronic device and allows to use one of the sensors which are typically used in the device, without the need for installing a dedicated ambient temperature sensor outside the casing of the device.

BRIEF DESCRIPTION OF FIGURES

The present invention is shown by means of exemplary embodiments on a drawing, in which.

DETAILED DESCRIPTION

Figure 1:
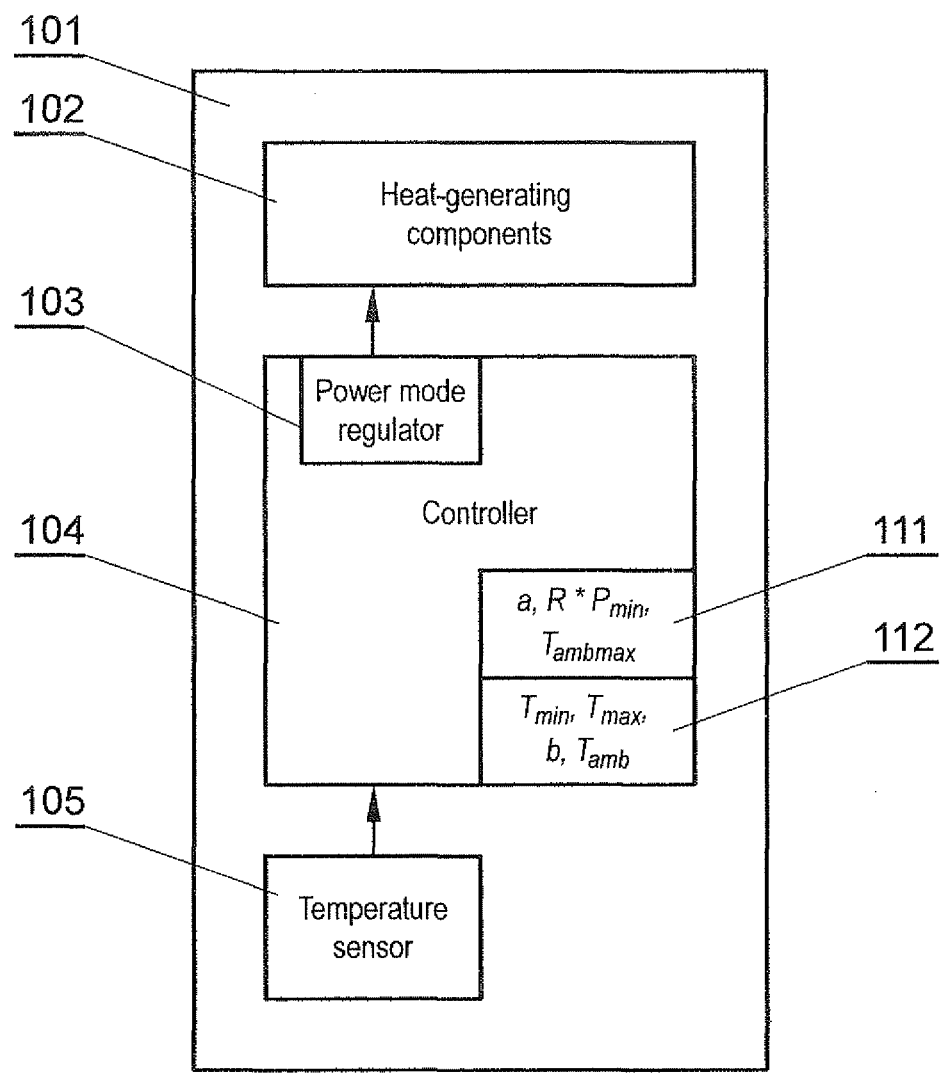
FIG. 1 presents a schematic of a typical electronic device in which the present invention can be applied.

FIG. 1 presents a schematic of a typical electronic device in which the present invention can be applied. The device has a casing 101, in which heat-generating components 102 are mounted.

The typical heat-generating components 102 include data processors, signal amplifiers or power supplies. A controller 104 is used to determine the temperature by analyzing the properties of the temperature sensor 105 and operating the power generating components according to the procedure shown in FIG. 2. The power generating components may be controlled by a power mode regulator 103, configured to set the device to operate in a specific power mode, such as active (including maximum power dissipation mode), inactive, off or standby.

The controller 104 comprises a non-volatile memory 111 for storing device-specific parameters: a coefficient of power dissipation change (a), a product ($R*P_{min}$) of thermal resistance (R) between the device and device's ambient and power dissipation ($P_{min}$), as well as the maximum allowed ambient temperature ($T_{ambmax}$). The controller 104 further comprises operational registers 112 for storing measurement data: the measured temperatures ($T_{min}$, $T_{max}$) and calculated coefficients: a coefficient of thermal resistance device-device's ambient change (b) and the determined ambient temperature ($T_{amb}$).

The following is a theoretical introduction to the present method.

In an inactive mode, called $E_{min}$, the following relation occurs in $E_{min}$ mode:

$$T_{min}=T_{ambEmin}+R_{min}*P_{min} \tag{1}$$

where:
$T_{min}$—the temperature indicated by temperature sensor 105 in $E_{min}$ mode,
$T_{ambEmin}$—the device's ambient temperature in $E_{min}$ mode,
$R_{min}$—thermal resistance device-device's ambient in $E_{min}$ mode,
$P_{min}$—power dissipated in $E_{min}$ mode.

In a higher power consumption mode, called $E_{max}$, wherein the device consumes more power than in the $E_{min}$ mode, the following relation occurs:

$$T_{max}=T_{ambEmax}+R_{max}*P_{max} \tag{2}$$

where:
$T_{max}$—the temperature indicated by temperature sensor 105 in $E_{max}$ mode,
$T_{ambEmax}$—the device's ambient temperature in $E_{max}$ mode,
$R_{max}$—thermal resistance device-device's ambient in $E_{max}$ mode,
$P_{max}$—power dissipated in $E_{max}$ mode.

The present invention assumes the ambient temperature is constant in $E_{min}$ and $E_{max}$ modes. In a typical set top box on average 30 minutes pass between a time when the device may reach a stable temperature in $E_{max}$ starting from a stable temperature in $E_{min}$. In other devices this time may be longer i.e. several hours.

Assuming that the ambient temperature is constant in $E_{min}$ and $E_{max}$ modes, $T_{amb}=T_{ambEmin}=T_{ambEmax}$ and the thermal resistance device-device's ambient is constant in $E_{min}$ and $E_{max}$ modes $R_{th}=R_{min}=R_{max}$, the equations (1) and (2) occurs in form:

$$\begin{cases} T\min = Tamb + Rth*P\min \\ T\max = Tamb + Rth*P\max \end{cases} \tag{3}$$

while $$Rth=R+\Delta R \tag{4}$$

where:
$R_{th}$—thermal resistance device-device's ambient in work environment,
R—thermal resistance device-device's ambient in lab environment i.e. an environment with a controlled ambient temperature, the device is working in environment compliant with this required by manual,
$\Delta R$—the difference between thermal resistance in work and lab environment,
and $$P\max=P\min+\Delta P \tag{5}$$

where $\Delta P$—difference between power dissipation in $E_{max}$ and $E_{min}$ modes,
the set of equations (3) equals $$\begin{cases} T\min = Tamb + (R+\Delta R)*P\min \\ T\max = Tamb + (R+\Delta R)*(P\min + \Delta P) \end{cases} \tag{6}$$

Dividing bilaterally (6) by product $R*P_{min}$ it gives $$\begin{cases} \dfrac{T\min - Tamb}{R*P\min} = \dfrac{(R+\Delta R)*P\min}{R*P\min} = \dfrac{R+\Delta R}{R} \\ \dfrac{T\max - Tamb}{R*P\min} = \dfrac{(R+\Delta R)*(P\min+\Delta P)}{R*P\min} = \dfrac{R+\Delta R}{R} * \dfrac{P\min+\Delta P}{P\min} \end{cases} \tag{7}$$

Assuming $$b = \frac{R+\Delta R}{R} \tag{8}$$

where b—coefficient of thermal resistance device-device's ambient change,
and $$a = \frac{P\min + \Delta P}{P\min} \quad (9)$$

where a—coefficient of power dissipation change, the set of equations (7) equals $$\begin{cases} \frac{T\min - Tamb}{R*P\min} = b \\ \frac{T\max - Tamb}{R*P\min} = b*a \end{cases} \quad (10)$$

Dividing bilaterally (10) it gives $$\frac{T\max - Tamb}{T\min - Tamb} = a \quad (11)$$

Hence the device's ambient temperature is $$Tamb = \frac{T\max - a*T\min}{1-a} \quad (12)$$

and coefficient of thermal resistance device-device's ambient change is $$b = \frac{T\min - Tamb}{R*P\min} \quad (13)$$

Replacing $T_{amb}$ with (12) it gives $$b = \frac{T\min - \frac{T\max - a*T\min}{1-a}}{R*P\min} = \frac{T\min - T\max}{R*P\min*(1-a)} \quad (14)$$

b=1 indicates that the device is working in environment compliant with this required by manual as shown by (8).

The coefficient a and product $R*P_{min}$ are constant and specific for each particular device. They may differ slightly between devices of the same type, due to variable parameters of electric or mechanical components used in each device. They are to be determined before device deployment in lab according to the procedure of FIG. 3.

As stated in (11), in lab environment i.e. for constant ambient temperature in $E_{min}$ and $E_{max}$ modes and constant thermal resistance device-device's ambient in $E_{min}$ and $E_{max}$ modes where $\Delta R=0$;

$$a = \frac{Tmaxl - Tambl}{Tminl - Tambl} \quad (15)$$

$$R*P\min = Tminl - Tambl \quad (16)$$

where
$T_{max1}$—the temperature indicated by temperature sensor in $E_{max}$ mode in lab environment,
$T_{mini}$—the temperature indicated by temperature sensor in $E_{min}$ mode in lab environment,
$T_{amb1}$—the device's ambient temperature in lab environment.

Figure 2:
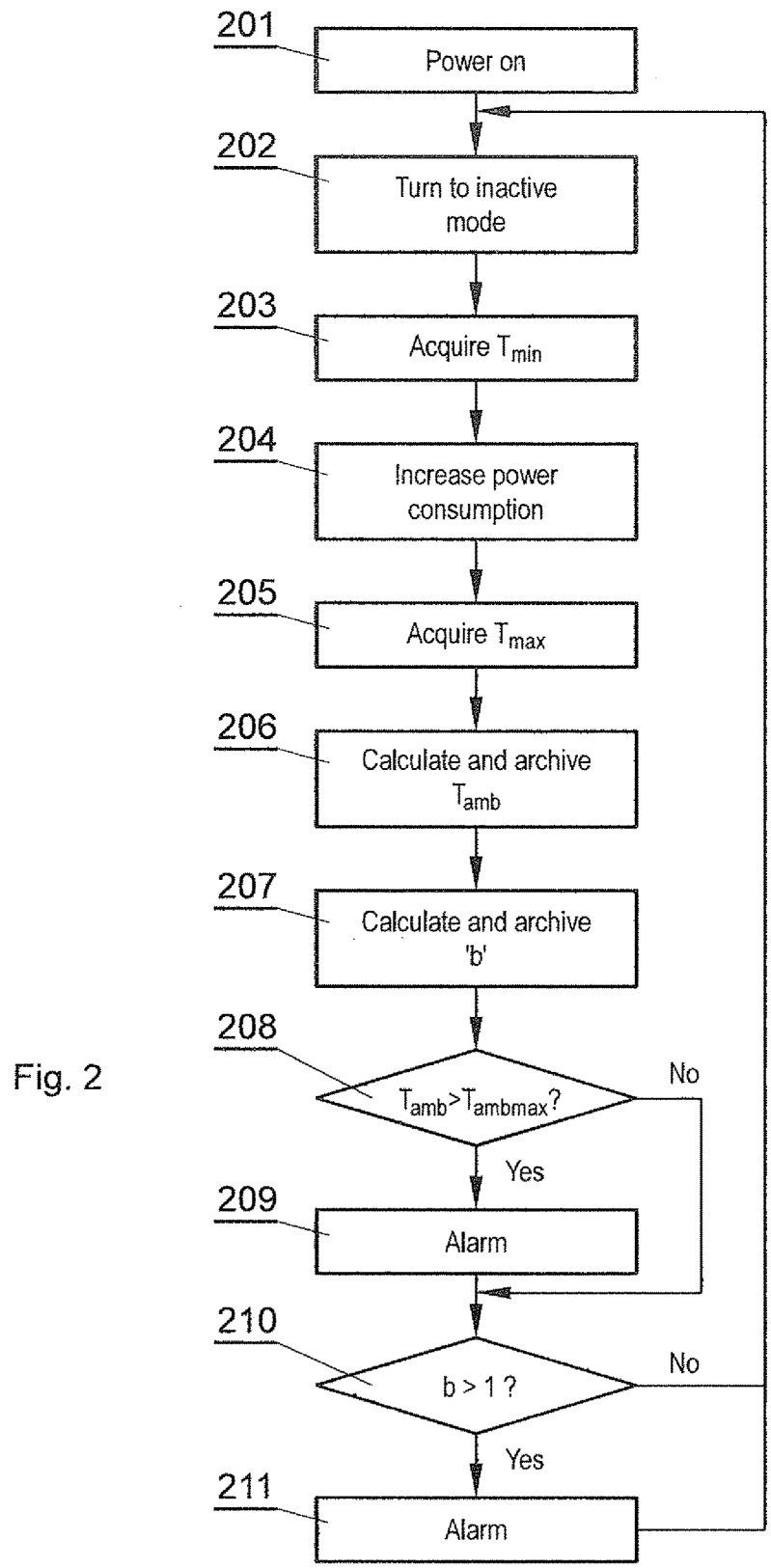
FIG. 2 presents a method for determining the ambient temperature.

FIG. 2 presents a method for determining the ambient temperature, the method being operated by the controller 104. The procedure starts after powering on the device in step 201, when the device is switched to an inactive mode in step 202. Then, the temperature $T_{min}$ is acquired in step 203 by reading the temperature measurement from the temperature sensor 105. Next, the power consumption is increased in step 204 by turning the device into higher power consumption mode via the power mode regulator 103, for example by activating the most power-consuming functions which are normally off in the inactive mode.

Then, in step 205, the temperature $T_{max}$ is read from the temperature sensor 105. Then, in step 206 the ambient temperature $T_{amb}$ is calculated on the basis of the equation (12) specified above. Next in step 207 the coefficient b can be calculated on the basis of the equation (13) specified above. In step 208 the controller checks whether the ambient temperature $T_{amb}$ is higher than the maximum allowed ambient temperature $T_{ambmax}$ and if so, it invokes an alarm in step 209.

Next, the controller can check in step 210 whether the coefficient b is higher than 1 and if so, it invokes an alarm in step 211. The procedure returns then to the inactive mode and the measurement procedure can be repeated upon a predetermined temperature measurement event. Therefore, the procedure of FIG. 2 allows determining, firstly, what is the ambient temperature ($T_{amb}$) and secondly, if there is a change of the device thermal resistance (b).

The temperature measurement event determines the moment at which the temperature should be measured. The temperature can be measured when the device operates in a mode which allows setting two distinct power modes, where in the second mode the device dissipates more power than in the first mode. For example, this can be done when the device is in a stand-by mode, where the higher power dissipation mode may be invoked temporarily. Alternatively, this can be done even when the device is in a normal operation mode, but not all the functions of the device are active and the device can be switched to a higher power mode (by activation additional functions) temporarily.

The event may be invoked cyclically, e.g. every hour or once per day (e.g. at specific time periods, such as at noon). Alternatively, the event may be invoked upon a change of state of the device, e.g. each time the device is switched to a stand-by mode or turned on from a power-off mode (with possible limitation that the measurement will be done e.g. once per day only).

Figure 3:
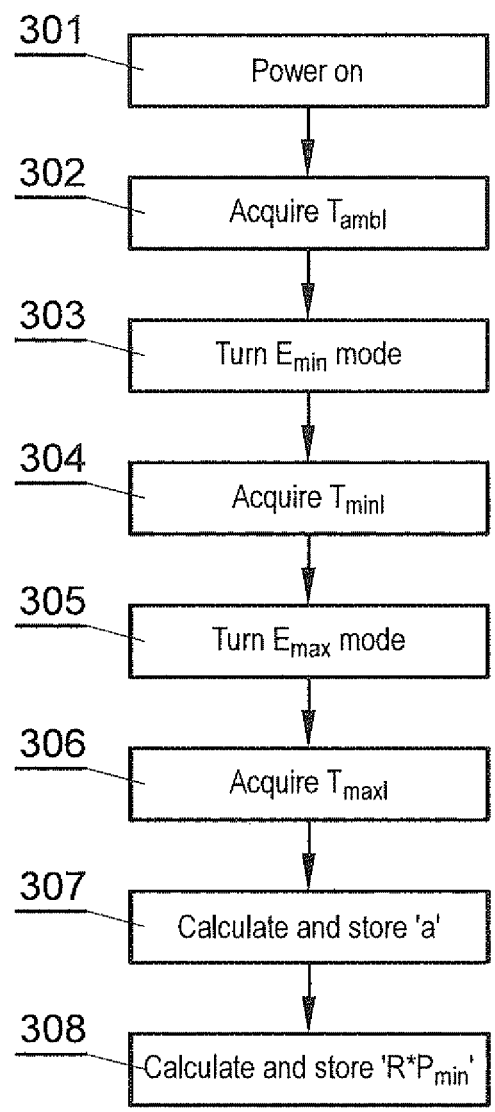
FIG. 3 presents a method for determining device-specific parameters.

FIG. 3 presents a procedure for measuring the parameters 'a', '$R*P_{min}$' for the particular device. The parameters are product specific and the measurements (calculation) should be performed at the designtests stage and or could be specific for a particular device and the procedure should be performed at the manufacturing stage after the device is fully assembled. For example, the procedure can be performed during burn-in tests of the device. First, in step 301 the device is powered on and the ambient temperature $T_{amb}$ is acquired using external sensor in step 302. The device is switched into inactive mode in step 303 and the temperature $T_{min}$ is read from the device temperature sensor 105 in step 304. Next, the device is switched to a higher power consumption mode in step 305 and the temperature $T_{max}$ is read in step 306 from the device temperature sensor 105. Then, in step 307 the value of coefficient a is calculated using formula (15) and stored in the non-volatile memory 111 of the device. Next, the value of $R*P_{min}$ is calculated in step 308 using formula (16) and stored in the non-volatile memory 111 of the device. The values (a) and ($R*P_{min}$) are stored in the non-volatile memory 111 of the device's controller together with allowed maximum temperature $T_{ambmax}$.

It can be easily recognized, by one skilled in the art, that the aforementioned method for determining ambient temperature of an electronic device may be performed and/or controlled by one or more computer programs. Such computer programs are typically executed by utilizing the computing resources of the device. The computer programs can be stored in a non-volatile memory, for example a flash memory or in a volatile memory, for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such is references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A method for determining the ambient temperature of an electronic device, the device comprising heat-generating components (102) and a temperature sensor (105) positioned within a common casing (101), the method comprising the steps of:

installing the device in an environment with a constant ambient temperature:
determining (307) a device-specific coefficient of power dissipation change (a) between a first ($E_{min}$) and second ($E_{max}$) power modes, wherein in the second power mode ($E_{max}$) the device dissipates more power than in the first power mode ($E_{min}$), subsequently, deploying the device in a work environment:
measuring (203-205) temperatures ($T_{min}$, $T_{max}$) by the temperature sensor (105) for the first power mode ($E_{min}$) and the second power mode ($E_{max}$),
calculating (206) ambient temperature ($T_{amb}$) as a function of the measured temperatures ($T_{min}$, $T_{max}$) and the device-specific coefficient of power dissipation change (a) as:

$$Tamb = \frac{T\max - a * T\min}{1 - a};$$

wherein $$\frac{T\max - Tamb}{T\min - Tamb} = a.$$

2. The method according to claim 1, further comprising the step of comparing the determined ambient temperature ($T_{amb}$) with a maximum allowed ambient temperature ($T_{ambmax}$) and invoking an alarm (209) in case the determined ambient temperature ($T_{amb}$) is higher than the maximum allowed ambient temperature ($T_{ambmax}$).

3. The method according to claim 2, further comprising the steps of:
in the environment with the constant ambient temperature:
determining (308) device-specific product ($R*P_{min}$) of thermal resistance (R) between the device and device's ambient and power dissipation ($P_{min}$) in the first power mode ($E_{min}$),
in the work environment:
determining (207) a coefficient of thermal resistance device-device's ambient change (b) as a function of the measured temperatures ($T_{min}$, $T_{max}$) and device-specific product ($R*P_{min}$) as:

$$b = \frac{T\min - Tamb}{R * P\min}.$$

4. A computer program comprising program code means for performing all the steps of the method according to claim 2 when said program is run on a computer.

5. A non-transitory computer readable medium storing computer-executable instructions performing all the steps of the method according to claim 2 when executed on a computer.

6. The method according to claim 1, further comprising the steps of:
in the environment with the constant ambient temperature:
determining (308) device-specific product ($R*P_{min}$) of thermal resistance (R) between the device and device's ambient and power dissipation ($P_{min}$) in the first power mode ($E_{min}$),
in the work environment:
determining (207) a coefficient of thermal resistance device-device's ambient change (b) as a function of the measured temperatures ($T_{min}$, $T_{max}$) and device-specific product ($R*P_{min}$) as:

$$b = \frac{T\min - Tamb}{R * P\min}.$$

7. The method according to claim 6, further comprising the step of, in case the calculated coefficient of thermal resistance (b) exceeds the value of 1, invoking an alarm (211).

8. A computer program comprising program code means for performing all the steps of the method according to claim 7 when said program is run on a computer.

9. A non-transitory computer readable medium storing computer-executable instructions performing all the steps of the method according to claim 7 when executed on a computer.

10. A computer program comprising program code means for performing all the steps of the method according to claim 6 when said program is run on a computer.

11. A non-transitory computer readable medium storing computer-executable instructions performing all the steps of the method according to claim 6 when executed on a computer.

12. A computer program comprising program code means for performing all the steps of the method according to claim 1 when said program is run on a computer.

13. A computer readable medium storing computer-executable instructions performing all the steps of the method according to claim 1 when executed on a computer.

14. An electronic device comprising heat-generating components (102) and a temperature sensor (105) positioned within a common casing (101), characterized in that the device further comprises:
- a non-volatile memory (111) configured to store a device-specific coefficient of power dissipation change (a) between a first ($E_{min}$) and second ($E_{max}$) power modes, wherein in the second power mode ($E_{max}$) the device dissipates more power than in the first power mode ($E_{min}$),
- a controller (104) configured to determine the ambient temperature by:
  - measuring (203-205) temperatures ($T_{min}$, $T_{max}$) by the temperature sensor (105) for the first power mode ($E_{min}$) and the second power mode ($E_{max}$),
  - calculating (206) the ambient temperature ($T_{amb}$) as a function of the measured temperatures ($T_{min}$, $T_{max}$) and the device-specific coefficient of power dissipation change (a), read from the non-volatile memory (111) as:

$$Tamb = \frac{T\max - a * T\min}{1 - a};$$

wherein $$\frac{T\max - Tamb}{T\min - Tamb} = a.$$

15. The device according to claim 14, characterized in that the controller (104) is further configured to compare the determined ambient temperature ($T_{amb}$) with a maximum allowed ambient temperature ($T_{ambmax}$) and to invoke an alarm (209) in case the determined ambient temperature ($T_{amb}$) is higher than the maximum allowed ambient temperature ($T_{ambmax}$).

16. The device according to claim 15, characterized in that:
- the non-volatile memory (111) is further configured to store device-specific product ($R*P_{min}$) of thermal resistance (R) between the device and device's ambient and power dissipation ($P_{min}$) in the first power mode ($E_{min}$), and
- the controller (104) is further configured to detect a coefficient of thermal resistance device-device's ambient change by determining (207) a coefficient of thermal resistance device-device's ambient change (b) as a function of the measured temperatures ($T_{min}$, $T_{max}$) and device-specific product ($R*P_{min}$) as:

$$b = \frac{T\min - Tamb}{R * P\min}.$$

17. The device according to claim 14, characterized in that:
- the non-volatile memory (111) is further configured to store device-specific product ($R*P_{min}$) of thermal resistance (R) between the device and device's ambient and power dissipation ($P_{min}$) in the first power mode ($E_{min}$),
- and the controller (104) is further configured to detect a coefficient of thermal resistance device-device's ambient change by determining (207) a coefficient of thermal resistance device-device's ambient change (b) as a function of the measured temperatures ($T_{min}$, $T_{max}$) and device-specific product ($R*P_{min}$) as $$b = \frac{T\min - Tamb}{R * P\min}.$$

18. The device according to claim 17, wherein the controller is further configured to, in case the calculated coefficient of thermal resistance (b) exceeds the value of 1, invoke an alarm (211).

* * * * *